US008660542B2

(12) United States Patent
McDonald et al.

(10) Patent No.: US 8,660,542 B2
(45) Date of Patent: Feb. 25, 2014

(54) METHOD AND APPARATUS FOR ALLOCATING FREQUENCIES AMONG MULTIPLE TALKGROUPS

(75) Inventors: Daniel J. McDonald, Cary, IL (US); Leslie G. Gustafson, Oakwood Hills, IL (US); Mark Shahaf, Vernon Hills, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 30 days.

(21) Appl. No.: 13/331,580

(22) Filed: Dec. 20, 2011

(65) Prior Publication Data

US 2013/0157634 A1 Jun. 20, 2013

(51) Int. Cl.
*H04M 3/42* (2006.01)

(52) U.S. Cl.
USPC ........ 455/416; 455/414.1; 455/518; 455/517; 379/202.01; 379/206.01; 370/260; 370/259

(58) Field of Classification Search
USPC .......... 455/416, 414.1, 518, 517; 379/202.01, 379/206.01; 370/260, 259
See application file for complete search history.

(56) References Cited

U.S. PATENT DOCUMENTS

| 5,231,699 | A | | 7/1993 | Tendler |
| 5,463,684 | A | * | 10/1995 | Morduch et al. ......... 379/202.01 |
| 5,513,381 | A | * | 4/1996 | Sasuta ........................... 455/509 |
| 5,537,684 | A | * | 7/1996 | Cassidy et al. ................ 455/512 |
| 6,684,080 | B1 | | 1/2004 | Barnes et al. |
| 7,979,027 | B2 | | 7/2011 | VanHarlingen et al. |
| 7,983,222 | B2 | | 7/2011 | Giaimo et al. |
| 2004/0047461 | A1 | * | 3/2004 | Weisman et al. ......... 379/202.01 |
| 2007/0274460 | A1 | * | 11/2007 | Shaffer et al. .................... 379/37 |
| 2008/0009308 | A1 | * | 1/2008 | Bar et al. .................... 455/550.1 |
| 2009/0168914 | A1 | * | 7/2009 | Chance et al. ................ 375/267 |
| 2009/0276214 | A1 | * | 11/2009 | Chong et al. .................. 704/235 |
| 2010/0087199 | A1 | * | 4/2010 | Chowdhary et al. .......... 455/450 |
| 2010/0137015 | A1 | * | 6/2010 | Blanco .......................... 455/518 |

FOREIGN PATENT DOCUMENTS

GB 2409129 A 6/2005
WO 2011041662 A1 4/2011

OTHER PUBLICATIONS

PCT International Search Report Dated Mar. 22, 2013 for Counterpart Application PCT/US2012/070002.

* cited by examiner

*Primary Examiner* — Khai M Nguyen
(74) *Attorney, Agent, or Firm* — Daniel R. Bestor

(57) ABSTRACT

A multi-carrier receiver radio monitors frequency channels associated with at least one talkgroup to which a multi-carrier receiver radio subscribes. The talkgroup is associated with a set of frequency channels that may carry group call activity. The radio monitors each frequency channel of the set of frequency channels associated with the talkgroup for group call activity. During monitoring, when a new call is detected on one frequency channel of the set of frequency channels associated with the talkgroup, the radio joins the new call. While joined to the new call, the radio continues to monitor the set of frequency channels associated with the talkgroup for additional transmissions to the talkgroup and to monitor a set of frequency channels associated with another talkgroup to which the multi-carrier receiver radio also subscribes for group call activity on the other talkgroup.

19 Claims, 5 Drawing Sheets

METHOD AND APPARATUS FOR ALLOCATING FREQUENCIES AMONG MULTIPLE TALKGROUPS

FIELD OF THE DISCLOSURE

The present disclosure relates generally to allocating a set of frequencies to a talkgroup.

BACKGROUND

Within a communications network, a variety of communication scenarios can co-exist. For example, a radio can be configured to be a member of a group of radios (also referred to herein as a talkgroup, which in addition to voice, may carry data, audio, and/or video), wherein a single radio may transmit information that is substantially simultaneously received by other members of the talkgroup. In some cases, a radio participating in a talkgroup may transmit information to and/or receive information from other radios in the talkgroup without the use of fixed infrastructure for controlling call establishment, call flow and call tear-down functions. That is, all call parameters including addresses, frequencies used, and basic operating attributes are pre-configured in the radio to enable initial connections to the talkgroup. This method of communication among radios in the talkgroup is referred to herein as direct communication. In other cases, the radio may transmit information to and/or receive information from other radios in the talkgroup via a repeater, for example a base station. In these cases, the radio may transmit information to the base station on a first frequency and the base station may further transmit the information to other radios in the talkgroup on a second frequency. This method of communication is referred to herein as conventional communication.

Talkgroup radio communications are widely used by, for example, public safety users. A radio may subscribe to one or more talkgroups, each of which is assigned to a specific frequency channel or pair of channels. When the radio is associated with more than one talkgroups, the radio is typically pre-configured to include an identifier for each associated talkgroup and the specific frequency channel(s) assigned to the associated talkgroup. In other words, for every talkgroup out of a predefined number talkgroups associated with the radio there is exactly one frequency channel or pair of channels from a set of frequency channels that the talkgroup is mapped to and the radio may be configured to include the talkgroup identifier and the associated frequency channel(s). For example, if there are three talkgroups—talkgroup 1, talkgroup 2, and talkgroup 3, each of which is assigned a respective frequency channel from a set of three frequency channels, then talkgroup 1 may be assigned to frequency channel 1, talkgroup 2 may be assigned to frequency channel 2, and talkgroup 3 may be assigned to frequency channel 3. During use, a radio associated with the three talkgroups may select one of the three talkgroups at any point in time. Upon selecting a talkgroup, the radio can use the assigned talkgroup frequency channel to transmit information to and/or receive information from other radios on the selected talkgroup.

In its basic operation, if the radio selects talkgroup 1, the radio is configured to monitor the corresponding frequency channel for talkgroup 1 (frequency channel 1) to detect call establishment on talkgroup 1. Accordingly, the radio is configured to receive and/or transmit information only on the selected talkgroup, i.e., talkgroup 1, until the radio selects another talkgroup, for example talkgroup 2, and tunes to the frequency channel assigned to talkgroup 2. Hence, while talkgroup 1 is selected, the radio cannot simultaneously monitor other talkgroups and the radio may miss information transmitted on these other talkgroups. One approach to overcoming this limitation allows for the radio to periodically switch between associated talkgroups to detect activity on a subset or any of the pre-programmed talkgroups. The limitations associated with switching between talkgroups are a direct function of, for example, how long it takes the radio to tune in to a new frequency channel, how long the radio has to stay on the frequency channel to detect a signal, how long it takes the radio to perform synchronization of time and frequency, or how long it takes the radio to recover any additional parameters that will enable decoding of information that the radio will use to determine what type of radio activity is present on a particular frequency channel. Because of these switching limitations, during the time it takes the radio to switch between talkgroups, the radio cannot monitor either one of the talkgroups. Therefore, during switching periods, the radio is subject to missed talkgroup communications. In addition, when call information is detected on the selected talkgroup, all other talkgroups will not be monitored for the duration of the call and the radio is subject to missed call information transmitted on other talkgroups while receiving call information on the selected talkgroup.

In some cases, multiple talkgroups may be assigned to the same frequency channel. For example, if there are thirty talkgroups and three frequency channels, talkgroups 1-10 may be assigned to frequency channel 1, talkgroups 11-20 may be assigned to frequency channel 2, and talkgroups 21-30 may be assigned to frequency channel 3. When an assigned frequency channel is in use, radios associated with other talkgroups that are also assigned to the currently used frequency channel cannot initiate calls on the other talkgroups, even if another frequency channel is available. Consider the following example where a call is established on talkgroup 1 using frequency channel 1. While the call is taking place on talkgroup 1, radios associated with talkgroups 2-10 that are also mapped to frequency channel 1 cannot initiate calls on talkgroups 2-10 as those calls will conflict with the ongoing call of talkgroup 1 and create destructive radio interference that can result in poor communications for radios operating in all talkgroups on the selected frequency channel. Even if frequency channel 3 is available, radios associated with talkgroups 2-10 cannot initiate calls on talkgroups 2-10 using frequency channel 3. Taking this example further, if a member of talkgroup 1 experiences an emergency during a period when another talkgroup 1 member is transmitting on frequency channel 1, in the current configuration if the member experiencing the problem attempts a new transmission on frequency channel 1 at the same time that the other member is sending an ongoing transmission on the frequency channel, the new transmission will be rejected, or if not rejected, interfere with the ongoing transmission.

Accordingly, there is a need for an improved method and apparatus for allocating frequencies among multiple talkgroups.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
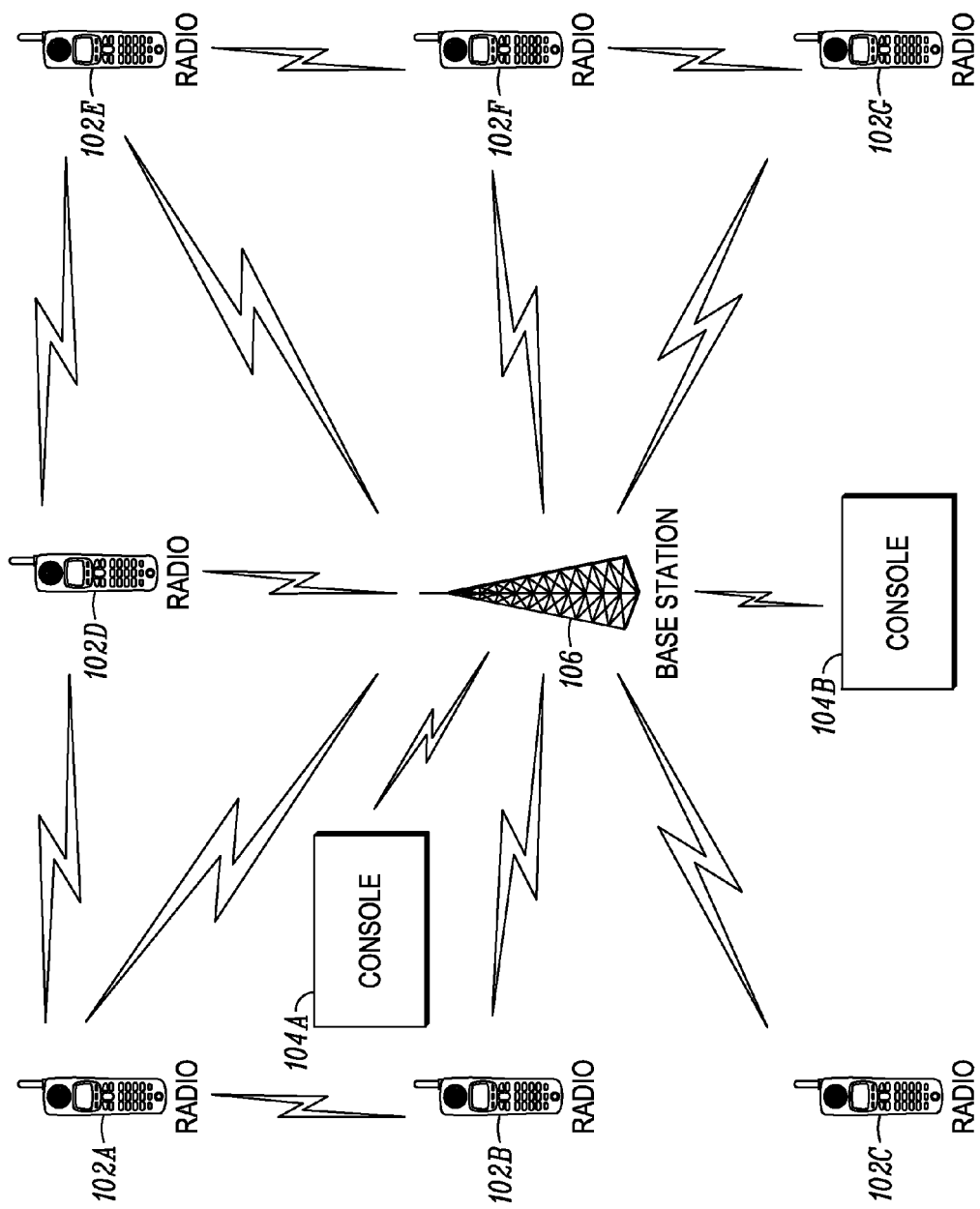
FIG. 1 is a block diagram of a radio system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Some embodiments are directed to methods and apparatuses for monitoring frequency channels associated with at least one talkgroup to which a multi-carrier receiver radio subscribes. The at least one talkgroup is associated with a set of frequency channels that may carry group call activity (e.g., including voice, data, audio, and/or video). The radio substantially simultaneously monitors each frequency channel of the set of frequency channels associated with the at least one talkgroup for group call activity. During monitoring, when a new call is detected on one frequency channel of the set of frequency channels associated with the at least one talkgroup, the radio joins the new call. While joined to the new call, the radio continues to monitor each frequency channel of the set of frequency channels associated with the at least one talkgroup for additional transmissions to the at least one talkgroup. The radio also continues to monitor a set of frequency channels associated with another talkgroup to which the multi-carrier receiver radio also subscribes for group call activity on the other talkgroup.

FIG. 1 is a block diagram of a radio system used in accordance with some embodiments. Radio system 100 may include portable/mobile communication devices and fixed communication devices. The portable/mobile communication devices may be radios, for example, portable two-way radios, mobile radios, cell phones utilizing Push-To-Talk Applications, or other similar portable or mobile voice communication devices. The portable/mobile communication devices are referred to as radios 102 in this discussion. The fixed communication devices may be consoles 104, for example, radio dispatch consoles. Radios 102 are used to facilitate communications between operating users by transmitting and receiving information on a group of pre-assigned frequency channels. Each radio 102 and/or console 104 may transmit information directly to each other or through a fixed network equipment (FNE), such as a base station 106. Base station 106 receives radio information for a talkgroup on a first frequency channel and transmits the received information to other radios in the talkgroup on a second frequency channel. Radios 102 and/or console 104 may operate in accordance with any standard or digital voice communication protocol, including, but not limited to, Project 25 (P25), Terrestrial Trunk Radio (TETRA), Digital Mobile Radio (DMR), and other Land Mobile Radio (LMR) radio network technologies. Radios 102 may also operate in accordance with Push-To-Talk over Cellular applications running over modern broadband connections, for example third generation and fourth generation connections such as third generation partnership project (3GPP) Long Term Evolution (LTE) connections. Other components of the radio system are not shown for ease of illustration.

Each radio 102 includes a multi-carrier receiver to enable the radio 102 to monitor multiple frequency channels simultaneously. Each radio 102 could, additionally or alternatively, include a multi-carrier transceiver (a device capable of transmitting and receiving information.) The multi-carrier receiver is a device capable of simultaneously demodulating two or more independent radio frequency transmissions on two or more radio frequency channels or two or more sub-carriers in a single frequency. In addition, each radio 102 may subscribe to one or more talkgroups, wherein each talkgroup may be associated with a group of valid frequency channels. For example, if there are thirty talkgroups and three frequency channels, talkgroups 1-30 may each be configured to send and receive information on frequency channels 1, 2 and 3. Accordingly, each radio 102 or base station 106 may be configured with the set of frequencies available for use. For example, each radio 102 may be configured with frequency channels 1, 2 and 3.

For direct communications, each talkgroup out of a predefined number of talkgroups may be mapped to any frequency from a set of frequencies. The set of frequencies may be preset and pre-programmed into each radio 102. A radio involved in direct communication, for example radio 102a, may select an associated talkgroup and monitor call activity for the selected talkgroup on any frequency channel from the set. Consider an example where radio 102a subscribes to talkgroup 5. Radio 102a may use a preconfigured identifier for talkgroup 5 to monitor call activity directed to talkgroup 5. When information is directed to radios on talkgroup 5 by another radio (for example radio 102b that is also subscribed to talkgroup 5), radio 102a may receive the information from radio 102b by monitoring a set of frequency channels, for example frequency channels 1, 2, and 3, associated with talkgroup 5. In other words, if a call on any of the monitored frequency channels is directed to talkgroup 5, radio 102a is configured to receive the call directed to talkgroup 5. Radio 102a may determine that the call is directed to talkgroup 5 by, for example, checking a header for each packet being transmitted on the monitored frequency channels for an identifier for talkgroup 5. When the header includes the identifier for talkgroup 5, radio 102a may receive the packet and present the audio information in the packet to an operating user.

Beyond the flexibility of receiving group communication on one frequency channel out of a set of frequency channels, a radio could simultaneously receive multiple calls sent to two or more talkgroups associated with the radio, or even two calls sent to the same talkgroup on two different frequencies from two different transmitting radios. Radio 102a could also be configured to monitor all configured frequency channels for information directed to more than one associated talkgroup. For example, if radio 102a is associated with talkgroups 1 and 2, a call directed to talkgroup 1 and on frequency channel 1 may be properly received by radio 102a. While the call on talkgroup 1 is in progress, a new call for talkgroup 2 may be set up on frequency channel 2. Radio 102a may decode information sent on frequency channel 2 while the call on talkgroup 1 is in progress and radio 102a may notify its operating user of the call on talkgroup 2. Radio 102a could play call information for the two or more talkgroup calls on its speaker simultaneously or according to predefined priority, wherein call information associated with a talkgroup with a higher priority could be played first or vice versa.

In order to transmit information to other radios associated with a selected talkgroup, radio 102a monitors associated frequency channels to detect a free frequency channel. Once a free frequency channel is detected, radio 102a may use the free frequency channel to transmit information to other radios associated with the selected talkgroup. Accordingly, radio 102a may initiate a call on any of the frequencies associated with one of its talkgroups. Other radios in the talkgroup would be able to simultaneously receive and properly decode information on multiple channels and these radios would be able to join or ignore calls on one or more other talkgroups according to pre-defined characteristics. As a result, there is no longer a direct dependency between a talkgroup and a specific operating frequency (or pair of frequencies).

In conventional communication, radio 102a may also monitor all available frequency channels for information being transmitted to an associated talkgroup. Continuing with the example where radio 102a subscribes to talkgroup 5, instead of receiving information sent directly from another radio (for example radio 102b that also subscribes to talkgroup 5), radio 102b may send the information for talkgroup 5 to base station 106 on a first frequency channel in a set of inbound frequency channels and base station 106 may forward the information from radio 102b to other radios associated with talkgroup 5 on a second frequency in a set of outbound frequency channels. Hence, in order to participate in an ongoing call on talkgroup 5, radio 102a is configured to monitor the set of outbound frequency channels to receive information for talkgroup 5 and to monitor the set of outbound frequency channels to determine if it can transmit to other members of talkgroup 5 on the inbound channels because if one or more of the outbound channels is determined to be free, the corresponding inbound channel should also be free.

Figure 2:
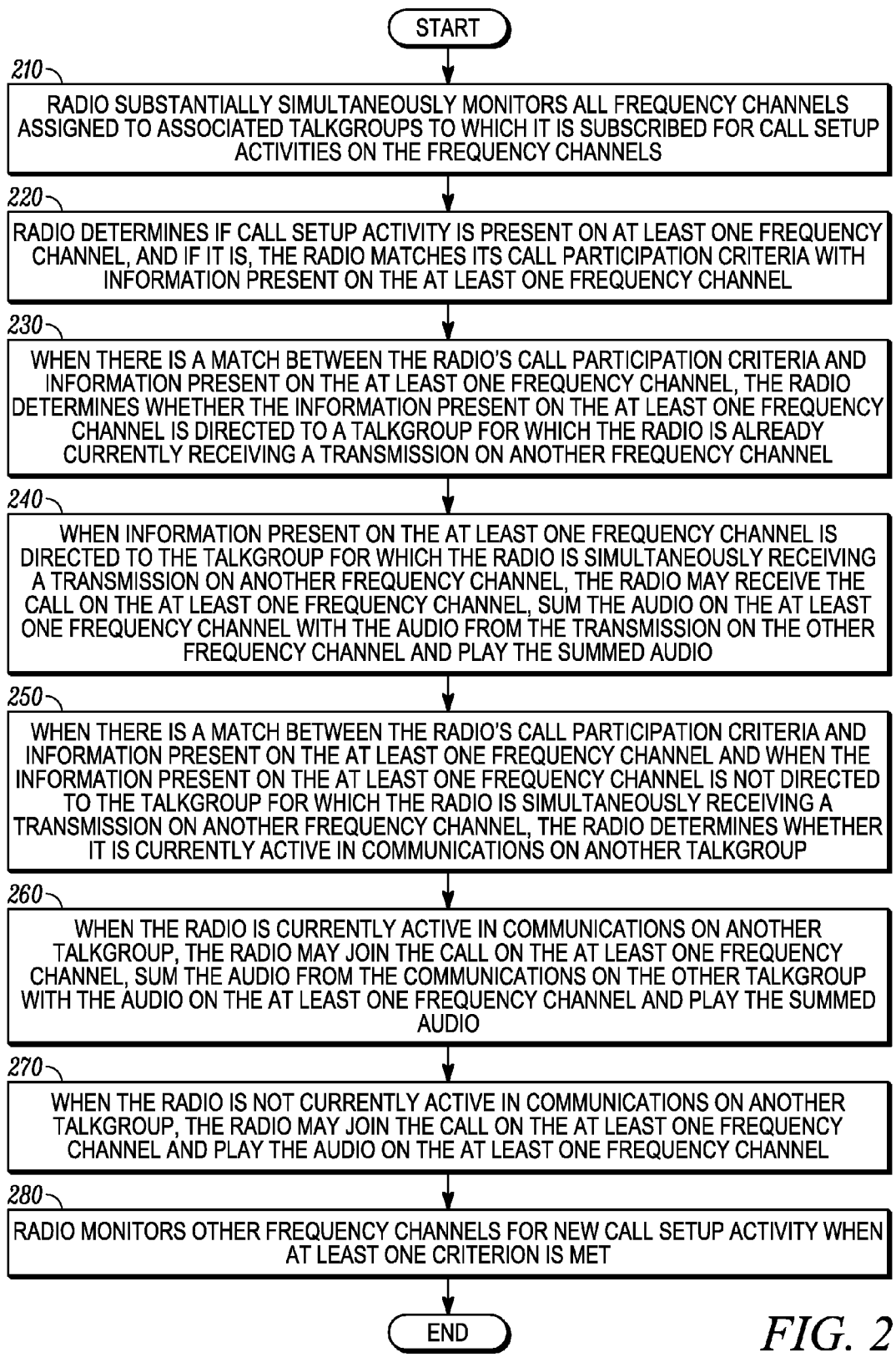
FIG. 2 is a flowchart of a method of operating a multi-carrier radio in accordance with some embodiments.

FIG. 2 is a flow diagram of a method of operating a multi-carrier receiver radio in accordance with some embodiments. In 210, a radio is configured to substantially simultaneously monitor all frequency channels assigned to associated talkgroups to which it is subscribed for call setup activities on the frequency channels. In 220, the radio determines if call setup activity is present on at least one frequency channel, and if it is, the radio matches its call participation criteria with information present on the at least one frequency channel. For example, the radio may determine whether a talkgroup identifier stored on the radio matches a talkgroup identifier present on the at least one frequency channel. In 230, when there is a match between the radio's call participation criteria and information present on the at least one frequency channel, the radio determines whether the information present on the at least one frequency channel is directed to a talkgroup for which the radio is already currently receiving a transmission on another frequency channel. In 240, when the information present on the at least one frequency channel is directed to the talkgroup for which the radio is simultaneously receiving a transmission on another frequency channel, the radio may receive the call on the at least one frequency channel, sum the audio on the at least one frequency channel with the audio from the transmission on the other frequency channel and play the summed audio.

Figure 3:
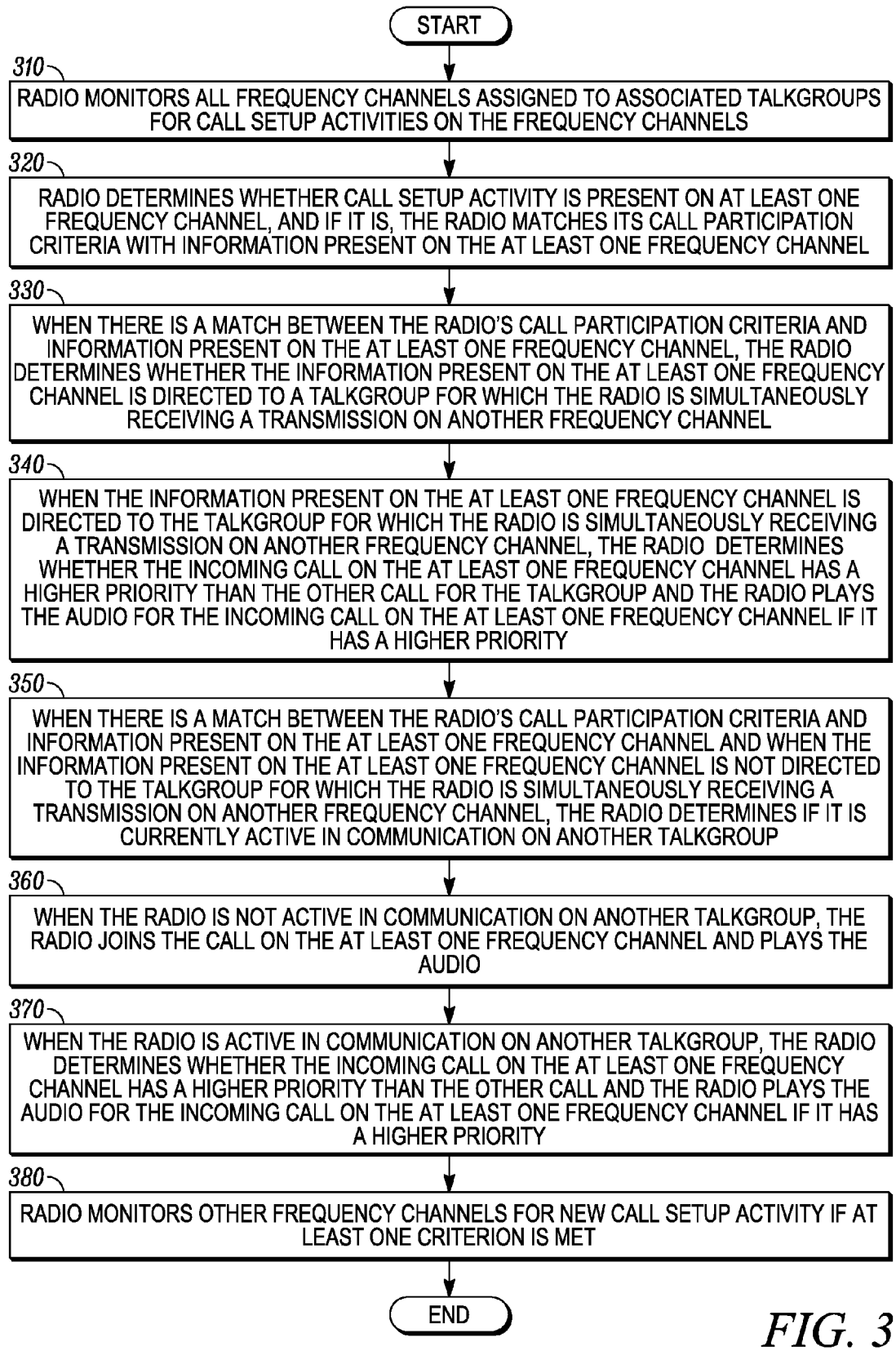
FIG. 3 is a flow diagram of a method of prioritization used in accordance with some embodiments.

In 250, when there is a match between the radio's call participation criteria and information present on the at least one frequency channel and when the information present on the at least one frequency channel is not directed to the talkgroup for which the radio is simultaneously receiving a transmission on another frequency channel, the radio determines whether it is currently active in communications on another talkgroup. In 260, when the radio is currently active in communications on another talkgroup, the radio may join the call on the at least one frequency channel, sum the audio from the communications on the other talkgroup with the audio on the at least one frequency channel and play the summed audio. In some embodiments, prior to joining the call on the at least one frequency channel and summing the audio from the communications on the other talkgroup with the audio on the at least one frequency channel, the radio sends a notification to an operating user and sums the audio in response to the user input. In 270, when the radio is not currently active in communications on another talkgroup, the radio may join the call on the at least one frequency channel and play the audio on the at least one frequency channel. In 280, the radio is configured to monitor other frequency channels for new call setup activity when at least one criterion is met. For example, the radio may monitor other frequency channels for new call setup activity if no call setup activity is present on the at least one frequency channel, if there is no match between the radio's call participation criteria and information present on the at least one frequency channel, and/or after the radio joins the call on the at least one frequency channel In some cases, the radio may not be configured to sum audio. FIG. 3 is a flow diagram of a method of prioritization used in accordance with some embodiments. In 310, the radio is configured to monitor all frequency channels assigned to associated talkgroups for call setup activities on the frequency channels. In 320, the radio determines whether call setup activity is present on at least one frequency channel, and if it is, the radio matches its call participation criteria with information present on the at least one frequency channel. In 330, when there is a match between the radio's call participation criteria and information present on the at least one frequency channel, the radio determines whether the information present on the at least one frequency channel is directed to a talkgroup for which the radio is simultaneously receiving a transmission on another frequency channel. In 340, when the information present on the at least one frequency channel is directed to the talkgroup for which the radio is simultaneously receiving a transmission on another frequency channel, the radio is configured to determine whether the incoming call on the at least one frequency channel has a higher priority than the other call for the talkgroup and the radio plays the audio for the incoming call on the at least one frequency channel if it has a higher priority.

In 350, when there is a match between the radio's call participation criteria and information present on the at least one frequency channel and when the information present on the at least one frequency channel is not directed to the talkgroup for which the radio is simultaneously receiving a transmission on another frequency channel, the radio determines if it is currently active in communication on another talkgroup. In 360, when the radio is not active in communication on another talkgroup, the radio is configured to join the call on the at least one frequency channel and play the audio. In some embodiments, the radio may notify the user and join the call in response to the user input. In 370, when the radio is active in communication on another talkgroup, the radio is configured to determine whether the incoming call on the at least one frequency channel has a higher priority than the other call and the radio plays the audio for the incoming call on the at least one frequency channel if it has a higher priority. In 380, the radio is configured to monitor other frequency channels for new call setup activity if at least one criterion is met. For example, the radio may monitor other frequency channels for new call setup activity if no call setup activity is present on the at least one frequency channel, if there is no match between the radio's call participation criteria and information present on the at least one frequency channel, after the radio joins the call on the at least one frequency channel, and/or if the incoming call on the at least one frequency channel has a lower priority than the other active call.

Because radios now have the ability to flexibly receive group calls on different channels, a specific talkgroup does not need to be mapped to a specific frequency. Therefore, when a radio is set to transmit information on a specific talkgroup, the frequency the radio uses is not fixed but instead can be flexibly chosen based on a determined set of currently available frequencies associated with the group.

Figure 4:
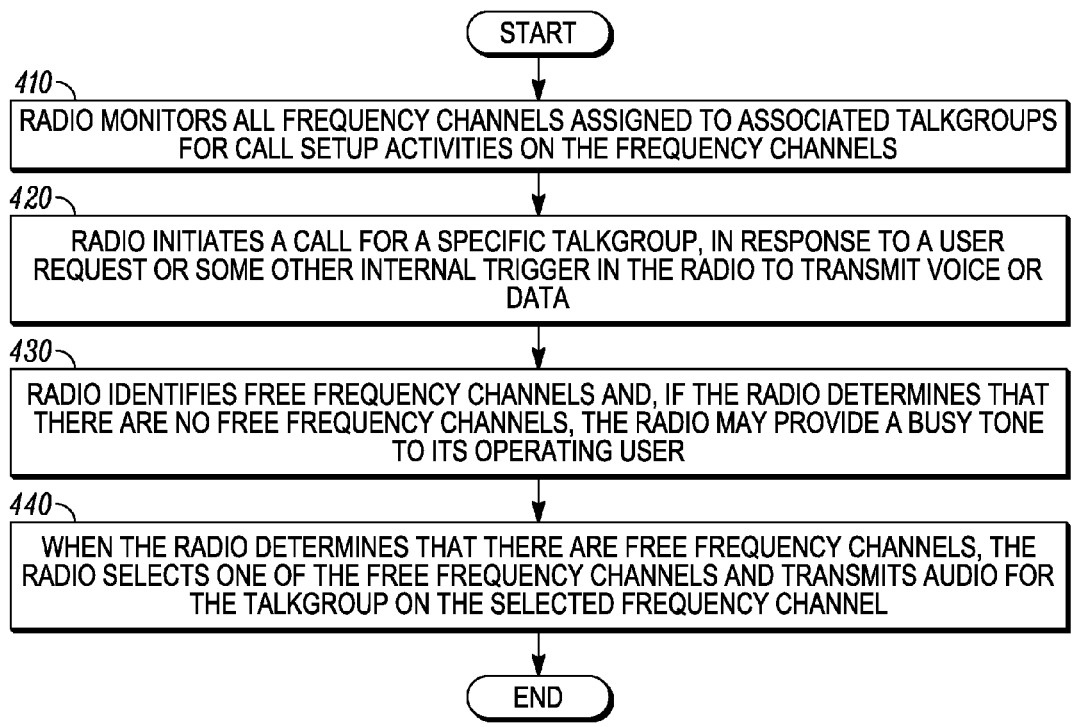
FIG. 4 is a flow diagram of a method performed by a transmitting radio in accordance with some embodiments.

FIG. 4 is a flow diagram of a method performed by a transmitting radio in accordance with some embodiments. In 410, the radio is configured to monitor all frequency channels assigned to associated talkgroups for call setup activities on the frequency channels. In 420, the radio initiates a call for a specific talkgroup, perhaps in response to a user request or some other internal trigger in the radio to transmit voice, data, audio, and/or video. In 430, the radio identifies free frequency channels and, if the radio determines that there are no free frequency channels, the radio may provide a busy tone to its operating user. In 440, when the radio determines that there are free frequency channels, the radio selects one of the free frequency channels and transmits audio for the talkgroup on the selected frequency channel.

The use of multi-carrier receiver technology in radios enables the radios to be significantly more efficient in utilizing available frequency channels. Calls on separate talkgroups can now be spread across multiple frequency channels to allow for more efficient use of the available frequency channels. According to some embodiments, receiving radios can prioritize audio or monitor multiple transmissions to provide more efficient call tracking to operating users.

Some embodiments of the frequency utilization described above may be implemented in conjunction with other division methods, such as code division multiple access (CDMA) and time division multiple accesses (TDMA) that could be applied to each frequency. Furthermore, each frequency could have a different multiplication scheme or any combination of such.

Figure 5:
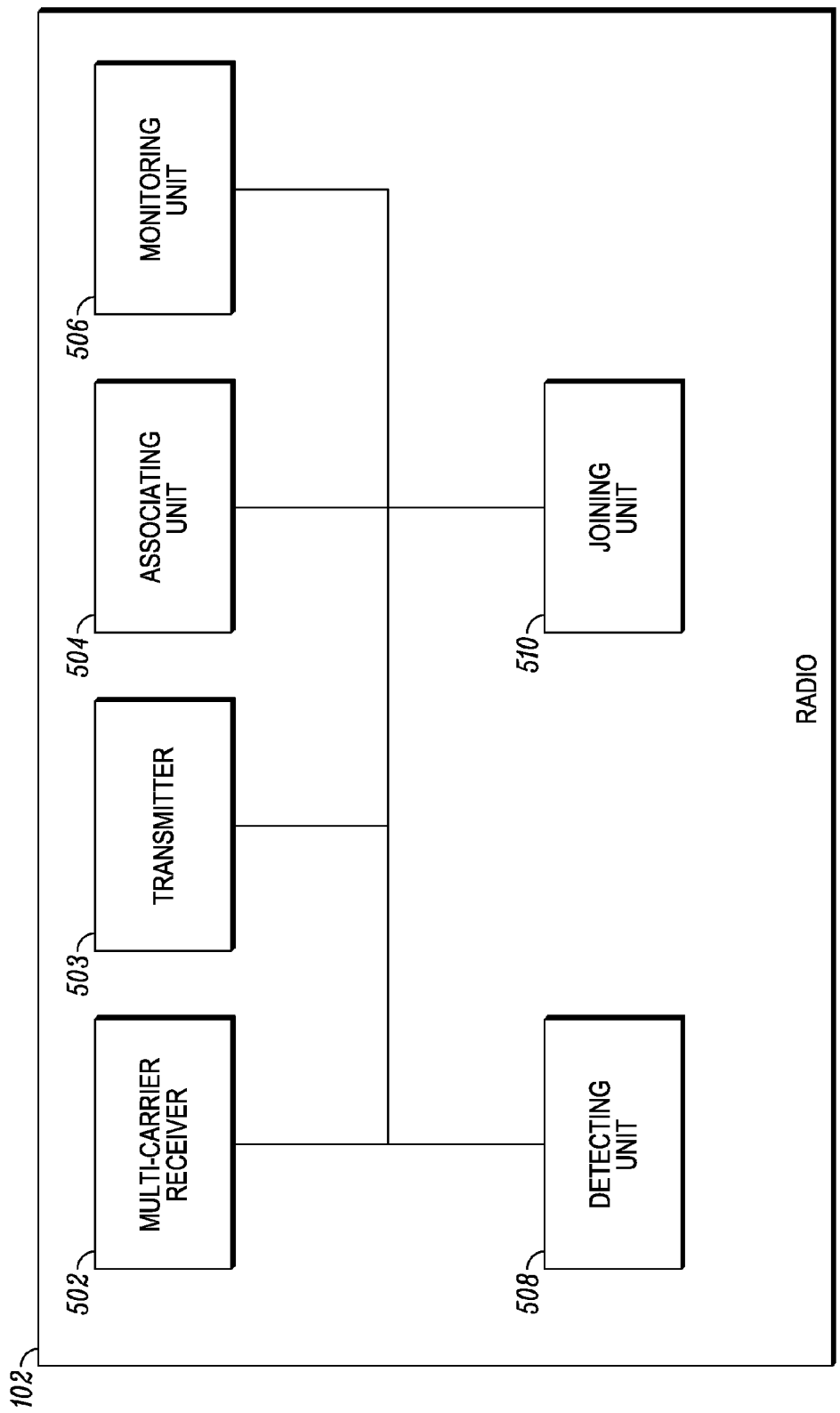
FIG. 5 is a block diagram of a radio in accordance with some embodiments.

FIG. 5 is a block diagram of a radio 102 configured to monitor frequency channels associated with at least one talkgroup to which radio 102 subscribes in accordance with some embodiments. Radio 102 includes a multi-carrier receiver 502, a transmitter 503 (which may be, for example, a single carrier transmitter or a multiple carrier transmitter, and which may be partly or entirely combined with receiver 502 to form a transceiver circuit), an associating unit 504, a monitoring unit 506, a detecting unit 508 and a joining unit 510. Associating unit 504 is configured to associate the at least one talkgroup with a set of frequency channels that may carry group call activity. Monitoring unit 506 is configured to monitor group call activity on each frequency channel of the set of frequency channels associated with the at least one talkgroup. Detecting unit 508 is configured to detect, during monitoring, a new call on one frequency channel of the set of frequency channels associated with the at least one talkgroup. Joining unit 510 is configured to join the new call. While joined to the new call, radio 102 is configured to continue to monitor a set of frequency channels associated with a current talkgroup for which radio 102 is receiving a call or another talkgroup to which radio 102 also subscribes for group call activity on the other talkgroup or on the current talkgroup. It should be appreciated that the functions of one or more of associating unit 504, monitoring unit 506, detecting unit 508 and joining unit 510 may be implemented in one or more processors in the radio 102.

In some embodiments, radio 102 may include a random access memory and a programmable memory that are coupled to a processor. The programmable memory can store operating code (OC) for the processor and code for performing functions associated with radio 102. For example, the programmable memory can include computer readable program code components configured to cause execution of a method for monitoring frequency channels associated with at least one talkgroup to which radio 102 subscribes in accordance with some embodiments. For example, OC associated with the multi-carrier receiver 502 and for performing the simultaneous monitoring of multiple frequency channels as set forth in FIGS. 2-4 may be stored in the programmable memory. OC associated with the associating unit 504, the monitoring unit 506, the detecting unit 508 and the joining unit 510 and for performing the respective associating, monitoring, detecting, and joining steps set forth in FIGS. 2-4 may also be stored in the programmable memory.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method in a multi-carrier receiver radio of monitoring frequency channels associated with a first talkgroup to which the multi-carrier receiver radio subscribes, the method comprising:
associating the first talkgroup with a set of two or more frequency channels, any one of which may carry group call activity for the first talkgroup;
substantially simultaneously monitoring for first talkgroup call activity on each frequency channel of the set of two or more frequency channels associated with the first talkgroup; and
during monitoring, detecting a new call to the first talkgroup on a particular one of the set of two or more frequency channels associated with the first talkgroup and joining the new call on the particular frequency channel.

2. The method of claim 1, further comprising while joined to the new call on the particular frequency channel, continuing to monitor each remaining frequency channel of the set of two or more frequency channels associated with the first talkgroup for additional transmissions to the first talkgroup.

3. The method of claim 1, further comprising initiating a transmission directed to the first talkgroup by identifying a free frequency channel in the remaining frequency channels in the set of two or more frequency channels associated with the first talkgroup and transmitting information to the first talkgroup on the identified free frequency channel.

4. The method of claim 1, further comprising while joined to the new call on the particular frequency channel, continuing to monitor a second set of one or more frequency channels associated with a second talkgroup to which the multi-carrier receiver radio also subscribes for second talkgroup call activity.

5. The method of claim 1, wherein the detecting the new call comprises matching a call participation criterion stored on the multi-carrier receiver radio against information present on the particular frequency channel.

6. The method of claim 1, wherein the joining the new call comprises determining that the multi-carrier receiver radio is already in active communication on a second talkgroup, joining the new call on the particular frequency channel, summing information from the active communication on the second talkgroup with information from the new call and playing back a summed audio signal.

7. The method of claim 1, wherein the joining the new call comprises determining that the multi-carrier receiver radio is already in active communication on a second talkgroup and joining the new call if the new call is assigned a higher priority than the active communication.

8. The method of claim 1, further comprising pre-programming the set of two or more frequency channels associated with the first talkgroup in the multi-carrier receiver radio.

9. The method of claim 1, wherein the set of two or more frequency channels includes a set of inbound frequency channels for receiving the new call directed to the first talkgroup via a repeater and a set of outbound frequency channels, different from the set of inbound frequency channels, for transmitting another call initiated at the multi-carrier receiver radio that is directed to the first talkgroup via the repeater.

10. A method in a multi-carrier receiver radio of monitoring frequency channels associated with a first talkgroup to which the multi-carrier receiver radio subscribes, the method comprising:
associating the first talkgroup with a set of two or more inbound frequency channels for receiving calls from other radios subscribed to the at first talkgroup via a repeater and a set of outbound frequency channels for transmitting calls to the other radios subscribed to the first talkgroup via the repeater;
substantially simultaneously monitoring for first talkgroup call activity on each frequency channel of the set of two or more inbound frequency channels associated with the first talkgroup; and
during monitoring, detecting a new call to the first talkgroup on a particular one of the set of two or more inbound frequency channels associated with the first talkgroup and joining the new call on the particular frequency channel.

11. The method of claim 10, further comprising while joined to the new call on the particular frequency channel, continuing to monitor each remaining frequency channel of the set of two or more inbound frequency channels associated with the first talkgroup for additional transmissions to the first talkgroup.

12. The method of claim 11, further comprising initiating a transmission directed to the first talkgroup by identifying a free frequency channel in the set of outbound frequency channels associated with the first talkgroup and transmitting information to the first talkgroup on the identified free frequency channel.

13. The method of claim 10, further comprising while joined to the new call on the particular frequency channel, continuing to monitor a second set of one or more frequency channels associated with a second talkgroup to which the multi-carrier receiver radio also subscribes for second talkgroup call activity.

14. A radio for monitoring frequency channels associated with a first talkgroup to which the radio subscribes, the radio comprising:
 a memory;
 a transmitter;
 a multi-carrier receiver; and
 a processor configured to:
  associate the first talkgroup with a set of two or more frequency channels, any one of which may carry group call activity for the first talkgroup;
  substantially simultaneously monitor, via the multi-carrier receiver, for first talkgroup call activity on each frequency channel of the set of two or more frequency channels associated with the first talkgroup;
  detect, via the multi-carrier receiver, a new call to the first talkgroup on a particular one of the set of two or more frequency channels associated with the particular talkgroup; and
  join, via the multi-carrier receiver, the new call on the particular frequency channel.

15. The radio of claim 14, further configured to monitor, via the multi-carrier receiver, while joined to the new call on the particular frequency channel, each remaining frequency channel of the set of two or more frequency channels associated with the first talkgroup for additional transmissions to the first talkgroup.

16. The radio of claim 15, further configured to initiate a transmission, via the transmitter, directed to other radios subscribed to the first talkgroup by identifying a free frequency channel in remaining frequency channels in the set of two or more frequency channels associated with the first talkgroup and transmitting information, via the transmitter, to the other radios on the identified free frequency channel.

17. The radio of claim 14, further configured, while joined to the new call on the particular frequency channel, to continue to monitor, via the multi-carrier receiver, a second set of one or more frequency channels associated with a second talkgroup to which the multi-carrier receiver radio also subscribes for second talkgroup call activity.

18. The radio of claim 14, further configured determine that the radio is already in active communication on a second talkgroup, join the new call on the particular frequency channel, sum information from the active communication, received via the multi-carrier receiver, on the second talkgroup with information, received via the multi-carrier receiver, from the new call and play back a summed audio signal.

19. The radio of claim 14, further configured to determine that the radio is already in active communication on a second talkgroup and join the new call if the new call is assigned a higher priority than the active communication.

* * * * *

UNITED STATES PATENT AND TRADEMARK OFFICE
CERTIFICATE OF CORRECTION

| | | |
|---|---|---|
| PATENT NO. | : 8,660,542 B2 | |
| APPLICATION NO. | : 13/331580 | |
| DATED | : February 25, 2014 | |
| INVENTOR(S) | : McDonald et al. | |

It is certified that error appears in the above-identified patent and that said Letters Patent is hereby corrected as shown below:

In the claims

In Column 10, Line 4, in Claim 3, delete "claim 1," and insert -- claim 2, --, therefor.

In Column 10, Line 49, in Claim 10, delete "to the at" and insert -- to the --, therefor.

Signed and Sealed this
Twenty-fourth Day of May, 2016

Michelle K. Lee
*Director of the United States Patent and Trademark Office*